No. 737,538. Patented August 25, 1903.

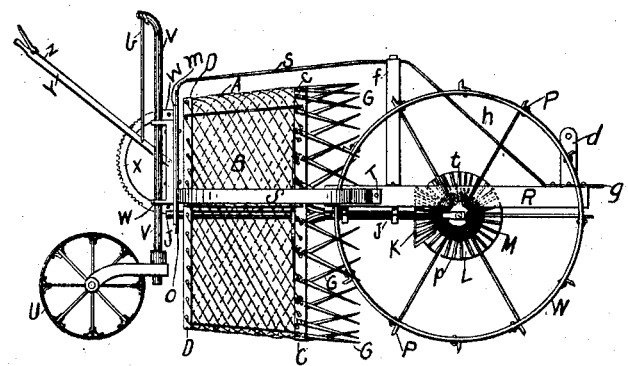
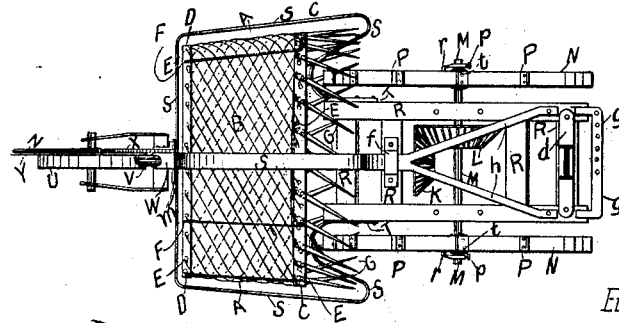
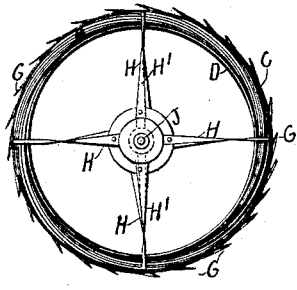
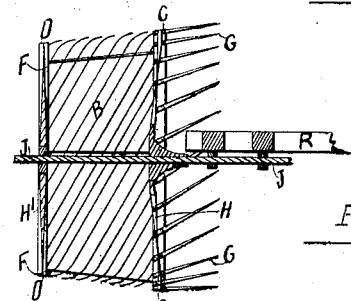
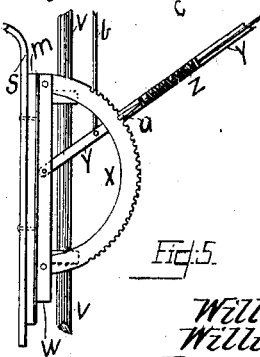

UNITED STATES PATENT OFFICE.

WILLIAM WATERS, OF AUCKLAND, AND WILLIAM KIDD ELDER, OF PENROSE, NEW ZEALAND, ASSIGNORS OF ONE-HALF TO SAMUEL COCHRANE MACKY, OF DAVENPORT, NEW ZEALAND.

ROTARY POTATO-DIGGER.

SPECIFICATION forming part of Letters Patent No. 737,538, dated August 25, 1903.

Application filed December 3, 1901. Serial No. 84,576. (No model.)

*To all whom it may concern:*

Be it known that we, WILLIAM WATERS, residing in the city of Auckland, and WILLIAM KIDD ELDER, engineer, residing at Penrose, in the Provincial District of Auckland and Colony of New Zealand, subjects of His Majesty the King of the United Kingdom of Great Britain and Ireland, have invented a certain new and useful Rotary Potato-Digger, of which the following is a specification.

This rotary potato-digger is designed to lift the potatoes from the drill in the ground in which they have been grown and to leave them behind the machine, where they can be picked and bagged.

It consists of a riddle of curved rods adjusted to a back and a front rim, which rims have spokes connecting them to a spindle operated by driving-gear which is worked by carrying-wheels keyed to a shaft set in a frame. The front rim carries tines secured to same at a suitable angle, which tines penetrate the earth beneath the potatoes, dig them out, and project them onto the inner part of the riddle, which leaves them on the ground behind. A swivel-wheel and quadrant-rack attachment is fixed to the back of the machine to raise or depress it, as required.

The drawings which accompany this specification show five figures, of which—

Figure 1 is a side elevation of the machine, showing its different parts. Fig. 2 is a plan of the machine. Fig. 3 is a rear elevation of the riddle, showing the back and front rims and spokes connecting them to spindle and tines in position on front rim. Fig. 4 is a sectional elevation through the center of Fig. 3. Fig. 5 is a side elevation of the quadrant-rack attachment on the opposite side to that shown in Fig. 1.

The curved rods A of the riddle B are secured to the front beveled rim C and beveled back rim D at E in such a way that the riddle A can be compressed or drawn out, as required. Stays F are provided to stiffen the riddle in any desired position. Tines G are fastened to the front rim C at a suitable angle. Spokes H connect the front rim C, and spokes H', the back rim D, to the spindle J. This spindle J is rotated by a beveled gear-wheel K, receiving its power from a larger beveled gear-wheel L, which engages it. The larger beveled gear-wheel L is keyed to the shaft M, worked and turned by the carrying and driving wheels N. These wheels N have secured to their outer sides grips P to give them a hold of the furrows in which they work. The shaft M is journaled to a front frame R, and this frame R has a back frame S secured to it at T, which back frame S is also adjusted to the spindle J at O. These frames R and S combine the parts into one machine and make it work as a whole. A clutch $p$ is screwed or otherwise fastened to each outer end of the shaft M and has an inwardly-projecting snug $r$ at one end of it, made to engage another snug $t$, provided on the boss of the wheel N, the action of which makes the wheel N a fixed wheel. To make the wheel N a free wheel the clutch $p$ is unfastened, lifted off the end of the shaft M, and turned around, so that the snug $r$ projects outward, and it is again put on and fastened to the end of the shaft, which reversal allows the wheel to run free.

A swivel or caster wheel U is journaled to the lower end of an upright shank V, which turns in two parallel holders projecting at right angles from a small frame W, riveted or held with an intermediate piece $m$ to the rear or back of the frame S, and a quadrant-rack X is secured to this frame W, on one side of it, between two pieces of angle-iron. A lever Y, carrying a spring-rod Z, having a tongue $a$ for engaging the quadrant-rack, is pivotally and intermediately connected to these angle-irons. A rod $b$ connects the lever Y to the top end of the shank V, and acting as a fulcrum to the lever Y enables the lever Y to lift or depress the riddle B. The piece $m$ is made wide, so as to carry the angle-irons which hold the quadrant, and it is adjusted to the spindle J, as shown in Fig. 1.

The front frame R has two double standards $d$ and $f$ affixed to it for holding and engaging a horse or bullock pole. The pole is passed through the front standard $d$ and loosely and inwardly secured to the back standard *f*. A bridle *g*, having holes in its near side, is secured to the front part of the frame R for the purpose of regulating and controlling the tendency of the tines G to work more to the off than the near side. The back standard *f* is suitably secured to the front of frame R by a stay *h*.

The tines G, as shown in the machine illustrated, are set at an angle of thirty-eight degrees, so as to suit the speed obtainable from the larger gear-wheel L, having thirty cogs, and the smaller wheel K, having twenty cogs—that is, in the ratio of three to two; but the tines G can be set at any angle which the speed at which the machine is running necessitates, and being set at an angle corresponding to the speed of the machine those tines which are at the bottom in the revolution of the riddle pass through the earth in a perfectly straight line.

When in operation the wheels N run in the furrows (one on each side of the drill) containing the potatoes and the bottom tines G engage the drill, entering it below the potatoes ordinarily, though they can be made to work higher by the riddle B being raised through the operation of the lever Y. As the tines lift the potatoes from the drill they pass them into the riddle by their rotary motion, and the same rotary motion passes the potatoes out from the back of the riddle and deposits them on the ground behind ready to be gathered up.

Though horse-power is provided for in the drawings any form of power can be used that may be found suitable.

The back rim D is beveled inwardly and is smaller than the front rim C, which is beveled outwardly.

The potato-stalks and other growth can be removed from the top of the drill in front of the machine by a chain adjustment thereto, and a cleaning apparatus can be provided to keep the tines clear.

Though four spokes are shown in the drawings as connecting the front rim C to the spindle J and two connecting the back rim D, more or fewer can be used, as circumstances may require.

A tine or other form of guard can be adjusted to the front of the swivel or caster wheel to push the potatoes out of its way.

Having fully described our invention, what we desire to claim, and secure by Letters Patent, is—

1. In a rotary potato-digger, front and rear supporting-frames, a spindle journaled in said frames, a riddle mounted upon said spindle and provided at its forward end with a series of angularly-disposed tines, means carried by the front frame, engaging with said spindle and adapted when operated to rotate the spindle and riddle, and means connected to the rear frame for vertically adjusting said riddle.

2. In a rotary potato-digger, front and rear supporting-frames suitably connected together, a spindle journaled in said frames, a riddle, spokes secured to the front and rear of said riddle for supporting it upon said spindle, a series of angularly-disposed tines connected to the forward end of said riddle, means carried by the front frame, engaging with said spindle and adapted when operated to rotate said spindle and riddle, and means connected to the rear frame for vertically adjusting said riddle.

3. In a rotary potato-digger, front and rear supporting-frames suitably connected together, a spindle journaled in said frames, a riddle, spokes secured to the front and rear of said riddle for supporting it upon said spindle, a series of angularly-disposed tines connected to the forward end of said riddle, a gear-wheel carried by the spindle, an operating-shaft journaled in the front frame, means carried by the operating-shaft and engaging with said gear and adapted when operated to impart a rotary movement to said spindle and riddle, and means connected to the rear frame for vertically adjusting said riddle.

4. In a rotary potato-digger, front and rear supporting-frames suitably connected together, a spindle journaled in said frames, a riddle, spokes secured to the front and rear of said riddle for supporting it upon said spindle, a series of angularly-disposed tines connected to the forward end of said riddle, a gear-wheel carried by the spindle, an operating-shaft journaled in the front frame, means carried by the operating-shaft and engaging the said gear and adapted when said shaft is operated to impart a rotary movement of said spindle and riddle, driving-wheels carried by said shaft for operating it, and means carried by the front frame for clutching and unclutching the said driving-wheels to and from said shaft.

5. In a rotary potato-digger, an extensible riddle, having a plurality of tines secured to one end thereof, means for supporting and operating said riddle, and means connected with the supporting means for vertically adjusting the riddle.

6. In a rotary potato-digger, front and rear frames, a spindle carried by said frames, a riddle mounted upon said spindle within the rear frame, and means carried by the front frame and engaging with the spindle for operating the riddle.

7. In a rotary potato-digger, front and rear frames, a spindle carried by said frames, an extensible riddle provided with angularly-disposed tines and mounted upon said spindle within the rear frame, and means carried by the front frame and engaging with the spindle for operating it imparting a rotary movement thereby to said riddle.

8. In a rotary potato-digger, front and rear frames, a spindle carried by said frames, an extensible riddle provided with angularly-disposed tines and mounted upon said spindle within the rear frame, means carried by the front frame and engaging with the spindle for operating it imparting a rotary movement thereby to said riddle, and means connected with the rear frame for vertically adjusting the riddle.

In testimony whereof we have hereunto set our hands in presence of two subscribing witnesses.

WILLIAM WATERS.
WILLIAM KIDD ELDER.

Witnesses:
GEORGE WILLIAM BASLEY,
PERCY HERBERT BASLEY.